(12) United States Patent
Burke

(10) Patent No.: US 9,782,656 B2
(45) Date of Patent: Oct. 10, 2017

(54) PUTTING STROKE ANALYSIS DEVICE

(71) Applicant: ANVECK LIMITED, Dublin (IE)

(72) Inventor: Desmond Burke, Celbridge (IE)

(73) Assignee: ANVECK LIMITED, Dublin (IE)

( * ) Notice: Subject to any disclaimer, the term of this patent is extended or adjusted under 35 U.S.C. 154(b) by 106 days.

(21) Appl. No.: 14/414,779

(22) PCT Filed: Jul. 17, 2013

(86) PCT No.: PCT/EP2013/065126
§ 371 (c)(1),
(2) Date: Jan. 14, 2015

(87) PCT Pub. No.: WO2014/012992
PCT Pub. Date: Jan. 23, 2014

(65) Prior Publication Data
US 2015/0182837 A1   Jul. 2, 2015

(30) Foreign Application Priority Data

Jul. 17, 2012  (IE) .................................. S2012/0316

(51) Int. Cl.
*A63B 57/00*   (2015.01)
*A63B 69/36*   (2006.01)
(Continued)

(52) U.S. Cl.
CPC ...... *A63B 69/3614* (2013.01); *A63B 24/0003* (2013.01); *A63B 24/0021* (2013.01);
(Continued)

(58) Field of Classification Search
CPC ... A63B 69/36; A63B 53/12; F41J 5/00; F41J 5/12
(Continued)

(56) References Cited

U.S. PATENT DOCUMENTS 3,788,748 A * 1/1974 Knight ....................... F41J 5/00
                                                 250/222.2
4,342,455 A * 8/1982 Miyamae ........... A63B 69/3614
                                                 473/222
(Continued)

*Primary Examiner* — Aarti B Berdichevsky
*Assistant Examiner* — Christopher Glenn
(74) *Attorney, Agent, or Firm* — Tutunjian & Bitetto, P.C.

(57) ABSTRACT

The present invention is directed towards a putting stroke analysis device for analyzing a putting stroke technique of a golfer. The putting stroke analysis device comprises a planar surface with a plurality of infrared emitters and co-operating infrared sensors thereon. A golfer swings their putter over the planar surface, above the plurality of infrared emitters and co-operating infrared sensors. An infrared beam, emitted by the infrared emitters, is reflected by the putter and is detected by one or more of the infrared sensors. The putting stroke analysis device has a processor which receives information from the co-operating infrared sensors and processes the information to determine putting characteristics of the putting stroke technique. The putting characteristics include, but are not limited to, speed of putter head, velocity of putter head, acceleration of putter head, speed of golf ball, velocity of golf ball, acceleration of golf ball, swing path of putter head, angle of attack of putter head, angle of putter head at impact with a golf ball, and, impact point on a putter face of the putter head at impact with a golf ball.

18 Claims, 10 Drawing Sheets

(51) Int. Cl.
*G09B 19/00* (2006.01)
*A63B 24/00* (2006.01)
A63B 102/24 (2015.01)
A63B 102/22 (2015.01)

(52) U.S. Cl.
CPC ...... *A63B 69/3661* (2013.01); *A63B 69/3676* (2013.01); *G09B 19/0038* (2013.01); *A63B 2102/22* (2015.10); *A63B 2102/24* (2015.10); *A63B 2220/18* (2013.01); *A63B 2220/20* (2013.01); *A63B 2220/30* (2013.01); *A63B 2220/40* (2013.01); *A63B 2243/002* (2013.01)

(58) Field of Classification Search
USPC .............. 473/219, 222, 297, 151; 356/141.1
See application file for complete search history.

(56) References Cited

U.S. PATENT DOCUMENTS

| | | | |
|---|---|---|---|
| 5,472,205 A | 12/1995 | Bouton | |
| 6,095,928 A * | 8/2000 | Goszyk | A63B 24/0021 345/158 |
| 6,227,984 B1 | 5/2001 | Blankenship | |
| 7,686,705 B1 * | 3/2010 | Foley | A63B 53/10 473/297 |
| 2003/0054898 A1 * | 3/2003 | Otten | A63B 69/3614 473/219 |
| 2003/0104874 A1 | 6/2003 | Galanis et al. | |
| 2005/0130755 A1 * | 6/2005 | Lindsay | A63B 24/0021 473/151 |

* cited by examiner

PUTTING STROKE ANALYSIS DEVICE

INTRODUCTION

This invention relates to a putting stroke analysis device. The putting stroke analysis device may be used as part of an entertainment game, such as a golf simulation, or as an analysis tool by golfers and/or coaches.

The game of golf consists of striking a golf ball into a designated hole. Initially, a golfer will use golf clubs which are designed to strike the golf ball up into the air, aiming to land the golf ball on to a green where the designated hole is located. Once on the green, the golfer then uses a putter to stroke the golf ball along the surface of the green and ultimately into the designated hole. The golfer then scores a game by counting the number of golf shots taken to strike the golf ball into the designated hole.

A golfer's score will often increase due to the number of attempts taken to stroke the golf ball along the surface of the green into the designated hole. It is estimated that approximately 40% of golf shots, by both professionals and amateurs alike, are taken on the greens. Despite the fact that putting represents the most often used type of golf shot, many golfers still find putting to be a difficult part of the game. Practicing golf is the most effective way of improving as a golfer and lowering the number of golf shots required by a golfer to strike the golf ball into the designated hole. Although putting is clearly an extremely important part of the game of golf, it is oftentimes neglected by golfers during practice routines. Commonly golfers will practice their golf swing at driving ranges, which predominantly cater for practising long golf shots such as drives, iron shots and chipping. Whilst practice greens are provided at such driving ranges, the quality of the practice greens can be significantly below the quality of greens found of golf course and most golfers do not see the benefit of practicing their golf putting at such low quality greens. It is true to say that most amateur golfers do not practice putting at driving ranges.

It has long been known that the provision of a putting practice device, which can be used at home, would be beneficial to golfers. Many such golf putting practice devices already exist. For the most part, as evidenced below, these prior art golf putting practice devices suffer from many limitations and provide relatively crude and unsophisticated feedback regarding the putting stroke and type of putt made by the golfer.

For example, many of the existing prior art putting practice devices simply comprise a putting mat and a designated target, or a hole, towards which a golfer can practice striking a golf ball. However, fundamental flaws in a golfer's putting stroke will not be identified by such devices. In fact, over time the golfer will be come accustomed to the location of the hole and the length of the putt, and consequently will become adept at successfully putting the golf ball on that particular putting device, whilst their general putting technique may still be fundamentally flawed.

There are a small number of prior art putting practice devices which are directed towards monitoring and analysing the golfer's putting stroke to assess whether the putting stroke is correct. These putting stroke analysis devices typically use infrared or other such signals to monitor the path of the putter during a putting stroke.

One such example of a putting stroke analysis device is U.S. Pat. No. 7,744,482 (WATSON). U.S. Pat. No. 7,744,482 discloses a putting stroke analyser having an upper deck and a lower deck, whereby the upper deck is at a right angle to the lower deck. The upper deck comprises infrared emitters and the lower deck comprises infrared sensors such that the infrared emitters continually beam an infrared signal towards one or more corresponding infrared sensors on the lower deck. As the upper deck is at a right angle to the lower deck, the beam of the infrared signal diagonally cuts across a space between the upper deck and lower deck of the putting stroke analyser. It is through this space that the golfer will swing the putter, by way of practicing their putting stroke. As the golfer swings the putter through the space, the infrared beam will be broken and consequently, the putting stroke of a golfer can be monitored and analysed by detecting which beams were broken, for how long, and at what time relative to one another. This allows the putting stroke analysis device to provide the golfer with feedback regarding their putting stroke and in particular how square the putter head was at impact, the speed of the putting stroke, and the estimated distance of the putt.

This prior art solution has been found to be undesirable as the solution requires the infrared beam to be broken, thus the infrared beam must be continuously on and travel a relatively long distance along a path between an infrared emitter on the upper deck and a complementary infrared sensor on the lower deck. Thus, the device of U.S. Pat. No. 7,744,482 results in relatively high power consumption. Furthermore, in order for there to be a continuous beam which is broken to indicate the location of the putter, the infrared emitter and sensor must be located so as to oppose one another. For compactness and portability of the device, this has resulted in the design shown in U.S. Pat. No. 7,744,482 where the upper and lower decks are arranged substantially orthogonally to one another. This increases the overall size of the device which is undesirable. Moreover, the infrared beam travels diagonally across the putting stroke space, and such an off-angle diagonal path can result in inaccurate results. For example, the same infrared beam will be broken by the putter when the distance of the putter from the golfer varies, but the height of the putter from the lower deck also varies. Thus, the location of the putter cannot be truly accurately detected by the arrangement as disclosed in U.S. Pat. No. 7,744,482.

Another example of a golf swing analysis device is disclosed in U.S. Pat. No. 8,118,687 (GALLOWAY), which describes another infrared-based system for measuring a golfer's golf swing. The golf club used must have infrared reflectors located on the golf club head and on the shaft of the golf club so that infrared sensors can measure the golf swing. The infrared reflectors must be placed on a toe-end position of the golf club head, and on lower and upper portions of the golf club shaft. As a golfer swings the golf club through a swing field, the infrared sensors emit infrared signals which are reflected by the plurality of infrared reflectors on the golf club and are sensed by infrared sensors. In this manner the path of the golf club through the swing field can be monitored and assessed.

There are disadvantages to such a design. Previous examples of putting practice stroke analysers incorporating infrared sensors have been found to be undesirable when it is necessary to place infrared reflectors on the golf club being used. Having to place infrared reflectors on the golf club results in an unwanted complexity to the initial setup of the system, which is both burdensome and time consuming for the golfer. Moreover, the weight distribution of the golf club being used by the golfer will be altered due to the attachment of the infrared sensors. The alteration of the weight distribution will cause the golf club to have a different feel to the golfer and this will impact the golfer's ability to replicate a golf swing when the infrared reflectors are not attached to the golf club. The weight distribution felt by the golfer when using a golf club with the infrared sensors will not accurately reflect the real-life situation which the golfer will experience.

It is a goal of the present invention to provide an apparatus that overcomes at least one of the above mentioned problems.

Throughout this specification, the term "putting stroke analysis device" shall be understood to encompass a planar surface, or a designated area in space across, above or through which a putting stroke may be practiced so that various putting characteristics such as, but not limited to, speed of putter head, velocity of putter head, acceleration of putter head, speed of golf ball, velocity of golf ball, acceleration of golf ball, swing path of putter head, angle of attack of putter head, angle of putter head when impacting a golf ball, impact point of putter head when impacting a golf ball and the like, may be detected and evaluated.

SUMMARY OF THE INVENTION

The present invention is directed towards a putting stroke analysis device for analysing a putting stroke technique of a golfer using a putter; the putting stroke analysis device comprising a planar surface with a plurality of infrared emitters and co-operating infrared sensors arranged on the planar surface; wherein, each of the plurality of infrared emitters is capable of emitting an infrared beam, and, each of the plurality of co-operating infrared sensors is capable of detecting a reflected infrared beam; whereby, the reflected infrared beam is reflected by the putter, passing above the plurality of infrared emitters and co-operating infrared sensors on the planar surface, during the execution of the putting stroke technique by the golfer; the putting stroke analysis device further comprising a processor which receives information from at least one of the plurality of co-operating infrared sensors and processes the information to determine putting characteristics of the putting stroke technique.

The advantage of providing such an infrared based putting stroke analysis device is that the putting stroke analysis device comprises a planar surface having both the infrared emitters and the co-operating infrared sensors on the planar surface, and therefore the infrared beams will have to be reflected back from the emitter towards the sensor by the putter. Thus, relatively low powered infrared emitters may be used and this will reduce the electrical consumption requirements of the device. Furthermore, the putting stroke analysis device is relatively compact to transport. In size, and as the device has relatively low electrical consumption requirements, the device may be battery powered which adds to the portability of the device.

Additionally, as the infrared beam will be at a low power level, the putter must pass in close proximity to the planar surface in order for the reflected infrared beam to be detected by the sensors. Thus, the putter must pass within 250 mm of the planar surface to be detected. Indeed, the infrared beam may be powered such that the putter must pass within 50 mm to be detected. Requiring the putter to pass in such close proximity to the planar surface eliminates spurious signals from other parts of the putter or other objects such as the golfer or the golfer's clothing, or, even cross-talk between non-adjacent emitters and sensors. The low-powered nature of the infrared emitters ensures that the accuracy of locating of the putter is relatively high as the putter must be very close to the actual infrared emitter for a strong reflection of the infrared signal to be established which will in turn be received and detected by one or more of the infrared sensors. This increases the accuracy of the device.

In a further embodiment, the planar surface lies in a substantially horizontal plane during use and the plurality of infrared emitters and co-operating infrared sensors are arranged in substantially the same transverse plane on the planar surface.

The advantage of providing the plurality of infrared emitters and the plurality of co-operating infrared sensors arranged in the substantially same transverse plane on the planar putting surface is that the low powered infrared beams may be used to detect the various putting characteristics such as speed of the putter, velocity of the putter, acceleration of the putter, speed of the golf ball which is struck, velocity of the golf ball which is struck, acceleration of the golf ball which is struck, swing path of the putter, angle of attack of the putter, angle of putter when impacting a golf ball, impact point of putter when impacting a golf ball, distance of putt based on speed of the putter and/or velocity of the putter and/or acceleration of the putter, distance of putt based on speed of golf ball and/or velocity of golf ball and/or acceleration of golf ball which is struck, and the like.

The main crux of the present invention is that the arrangement of the planar surface and the plurality of the infrared emitters and the infrared sensors is that low powered infrared beams may be used as the infrared beams do not have to travel a great distance. Therefore, in the preferred embodiment, infrared beams have a wavenumber in the range of 14,000 $cm^{-1}$ to 4,000 $cm^{-1}$ which is approximately equivalent to a wavelength in the range of 0.8 to 2.5 μm.

In a further embodiment, the plurality of infrared emitters and the plurality of co-operating infrared sensors are arranged in a plurality of clusters; whereby, each of the plurality of clusters comprises at least one infrared emitter, at least one co-operating infrared sensor, and, an infrared blocking shield located intermediate the at least one infrared emitter and the at least one co-operating infrared sensor such that only the reflected infrared beam can be detected by the at least one co-operating infrared sensor.

The advantage is that no cross-talk will occur between an infrared emitter and an infrared sensor without the infrared beam having been reflected by the putter.

In a further embodiment, at least one cluster comprises a plurality of infrared emitters arranged in a co-linear manner and a plurality of co-operating infrared sensors arranged in a co-linear manner; whereby, the plurality of co-linear infrared emitters and the plurality of co-linear co-operating infrared sensors are arranged in parallel; and, the at least one cluster further comprising an elongated infrared blocking shield located intermediate the plurality of co-linear infrared emitters and the plurality of co-linear co-operating infrared sensors, such that only the reflected infrared beam can be detected by the at least one co-operating infrared sensor.

In a further embodiment, at least one cluster comprises a plurality of infrared emitters arranged in a co-linear manner and a plurality of co-operating infrared sensors arranged in a co-linear manner; whereby the plurality of co-linear infrared emitters and the plurality of co-linear co-operating infrared sensors are arranged in parallel; and, the at least one cluster further comprising a plurality of infrared blocking shields which are located intermediate the plurality of co-linear infrared emitters and the plurality of co-linear co-operating infrared sensors respectively, such that only the reflected infrared beam can be detected by the at least one co-operating infrared sensor.

The advantage of using clusters is that more specific accuracy and measurements can be obtained.

In a further embodiment, the infrared beam emitted by the infrared emitter is modulated. In a further embodiment, the infrared beam emitted by the infrared emitter is modulated at a modulation frequency which is in the range of 20 kHz to 100 kHz. In a further embodiment, the infrared beam emitted by the infrared emitter is modulated at a modulation frequency which is substantially 38 kHz. In an alternative embodiment, the infrared beam emitted by the infrared emitter is modulated at a modulation frequency which is substantially 56 kHz.

In a further embodiment, the putting stroke analysis tool comprises a band pass filter to attenuate detected infrared beams outside of the band pass filter range. In a further embodiment, each of the co-operating infrared sensors comprises a band pass filter to attenuate detected infrared beams outside of the band pass filter range. In an alternative embodiment, the processor comprises a band pass filter to attenuate detected infrared beams outside of the band pass filter range. Preferably, the band pass filter is centred at substantially 38 kHz or substantially 56 kHz.

In a further embodiment, the putting stroke analysis tool comprises a high gain amplifier. In a further embodiment, each of the co-operating infrared sensors comprises a high gain amplifier. In an alternative embodiment, the processor comprises a high gain amplifier. Preferably, the high gain amplifier comprises at least a 40 dB gain.

In a further embodiment, the plurality of infrared emitters and the plurality of co-operating infrared sensors are used to measure at least one of the putting characteristics of the putter prior to the putter impacting with a golf ball.

In a further embodiment, the plurality of infrared emitters and the plurality of co-operating infrared sensors are used to measure at least one of the putting characteristics of the putter as the putter impacts a golf ball.

In a further embodiment, the plurality of infrared emitters and the plurality of co-operating infrared sensors are used to measure at least one of the putting characteristics of the putter subsequent to the putter impacting with a golf ball.

In a further embodiment, one of the putting characteristics of the putting stroke technique is a speed of a putter head of the putter.

In a further embodiment, one of the putting characteristics of the putting stroke technique is a velocity of a putter head of the putter.

In a further embodiment, one of the putting characteristics of the putting stroke technique is an acceleration of a putter head of the putter.

In a further embodiment, one of the putting characteristics of the putting stroke technique is a speed of a golf ball immediately after impact by the putter.

In a further embodiment, one of the putting characteristics of the putting stroke technique is a velocity of a golf ball immediately after impact by the putter.

In a further embodiment, one of the putting characteristics of the putting stroke technique is an acceleration of a golf ball immediately after impact by the putter.

In a further embodiment, one of the putting characteristics of the putting stroke technique is an angle of a putter head of the putter, whereby the angle of the putter head is measured with respect to an ideal putting line.

In a further embodiment, one of the putting characteristics of the putting stroke technique is an impact point of a putter head of the putter, whereby the impact point is measured as being a point on a putter face of the putter head which impacted with a golf ball.

In a further embodiment, one of the putting characteristics of the putting stroke technique is a swing path of a putter head of the putter, whereby the swing path is measured as being a path along which the putter head traveled prior to impacting with a golf ball.

In a further embodiment, the putting stroke analysis tool comprises a putt distance look-up table, and the putt distance look-up table holds putt distance values based on putter speed and/or putter acceleration values; the putting stroke analysis tool determines a distance of a putt by: measuring a speed and/or an acceleration of a putter head of the putter substantially as the putter impacts a golf ball; and, consulting the putt distance look-up table to retrieve a putt distance value based on the measured speed and/or an acceleration of the putter head of the putter.

In a further embodiment, the putt distance look-up table holds putt distance values based on putter speed and/or putter acceleration values, and, based on type of surface which the putting stroke analysis tool is being used on; the putting stroke analysis tool determines a distance of a putt by: ascertaining which type of surface the putting stroke analysis tool is being used on; measuring a speed and/or an acceleration of a putter head of the putter substantially as the putter impacts a golf ball; and, consulting the putt distance look-up table to retrieve a putt distance value based on the ascertained type of surface the putting stroke analysis tool is being used on, and, the measured speed and/or an acceleration of the putter head of the putter.

In a further embodiment, the putt distance look-up table holds putt distance values based on historical data input by the golfer, or a series of stimpmeter calculations input by the golfer.

In a further embodiment, the step of measuring a speed and/or an acceleration of a putter head of the putter substantially as the putter impacts a golf ball comprises measuring a speed and/or an acceleration of a putter head of the putter within a predetermined time period of a putter head of the putter impacting the golf ball.

In a further embodiment, the putting stroke analysis tool determines a distance of a putt by a calculation of a momentum of a golf ball struck by the putter. Using the conservation of momentum principle, and assuming a known mass for the putter head of the putter and a known mass of the golf ball being struck, with a measurement of the speed of the putter head of the putter before the putter head impacts the golf ball and after the putter head impacts the golf ball, the momentum of the putter before the impact of the golf ball and the momentum of the putter head after the impact of the golf ball can be determined. The difference would be substantially equal to the momentum of the golf ball and as the mass of the golf ball is known, the speed of the golf ball can be determined. With a stimp reading and the speed of the golf ball, a distance of the putt can be determined.

Alternatively, by measuring a speed of the golf ball just after impact, and using a stimp reading or a look-up table, the distance of the putt can be determined in a simpler fashion.

In a further embodiment, the putting stroke analysis tool comprises a screen to display the putting characteristics of the putting stroke technique to the golfer.

In a further embodiment, the putting stroke analysis tool comprises an I/O port to transfer the putting characteristics of the putting stroke technique to an external device.

In a further embodiment, the external device is a computer. Alternatively, the external device is a display screen.

In one embodiment, the putting stroke analysis tool is used as part of a virtual golf game. In another embodiment, the putting stroke analysis tool is used as part of a swing analysis by a golf coach.

The present invention is further directed to a putting stroke analyser comprising a planar putting surface having a plurality of infrared emitters and a plurality of co-operating infrared sensors located beneath the planar putting surface, whereby the plurality of infrared emitters and a plurality of co-operating infrared sensors are arranged in the substantially same transverse plane beneath the planar putting surface; wherein, an infrared beam, emitted from one of the plurality of infrared emitters, may be reflected by a putter head, passing above the planar putting surface, back towards one of the plurality of co-operating infrared sensors to indicate the location of the putter above the planar putting surface.

The advantage of providing the plurality of infrared emitters and the plurality of co-operating infrared sensors arranged in the substantially same transverse plane beneath the planar putting surface is that relatively low powered infrared beams may be used to detect various putting characteristics such as speed, velocity, acceleration, swing path, angle of attack, angle of putter head, impact point, distance of putt based on speed and/or acceleration of putter head, distance of putt based on speed and/or acceleration of golf ball which is struck, and the like. Low powered infrared beams may be used as the infrared beams do not have to travel a great distance.

Furthermore, as the infrared beam, emitted from one of the plurality of infrared emitters, is reflected by a putter head, passing above the planar putting surface, back towards one of the plurality of co-operating infrared sensors to indicate the location of the putter above the planar putting surface, the infrared emitter may be relatively low powered.

Additionally the infrared beam is controlled to a low power level such that the putter head must be in close proximity to the planar putting surface, of the order of less than 250 mm max, and preferably less than 50 mm, in order for the reflected beam to be detected. This eliminates spurious signals from other parts of the club or other objects such as the golfer or the golfer's clothing, or, cross-talk between non-adjacent emitters and sensors. The low-powered nature of the infrared emitters ensures that the accuracy of locating of the putter head is relatively high as the putter head must be very close to the actual infrared emitter for a strong reflection of the infrared signal to be established which will in turn be received and detected by one or more of the infrared sensors.

In a further embodiment, the infrared beam emitted by the infrared emitter is modulated. In a further embodiment, the modulation frequency is in the range of 20 kHz to 100 kHz, and preferably at substantially 38 kHz or 56 kHz.

In a further embodiment, the infrared sensor comprises a band pass filter. Preferably, the band pass filter is centred at substantially 39 kHz or 56 kHz.

In a further embodiment, the infrared sensor comprises a high gain amplifier. Preferably the high gain amplifier is at least 40 dB.

In a further embodiment of the invention, the plurality of infrared emitters and the plurality of infrared sensors are arranged in clusters. Preferably, each cluster comprises at least one infrared emitter, an infrared sensor, and, an infrared blocking shield located between the infrared unit and the infrared sensor so that only reflected infrared beam can be detected by the infrared sensor.

In a further embodiment, at least one cluster comprises a plurality of substantially co-linearly arranged infrared emitters and a plurality of substantially co-linearly arranged, co-operating complementary infrared sensors in parallel with the infrared emitters and an elongated infrared blocking shield located therebetween, or individual blocking shields.

In a further embodiment, the plurality of infrared emitters and the plurality of co-operating infrared sensors are used to measure various putting characteristics of the putter head prior to the putter head impacting with a golf ball, and/or during the putter head impacting with a golf ball, and/or after the putter head impacting with a golf ball.

In a further embodiment, the plurality of infrared emitters and the plurality of co-operating infrared sensors are used to measure various putting characteristics of the putter head subsequent to the putter head impacting with a golf ball.

In a further embodiment, the plurality of infrared emitters and the plurality of co-operating infrared sensors are used to measure various putting characteristics of the putter head prior to and subsequent to the putter head impacting with a golf ball.

In a further embodiment, a distance of a putt may be determined by measuring the speed and/or acceleration of the putter head at impact, or within a short time of the putter head impacting the golf ball, and subsequently determining a distance of the putt based on one of: a) calculating the distance of the putt based on a stored table of values of distances for different putter head speeds for different surfaces; or, b) a default value of distance for typical surfaces; or, c) a calculation of a momentum of a golf ball based on the putter head mass, speed of the putter head at impact, stimp reading for a surface over which the golf ball is being struck and golf ball mass; or, d) calculation of a momentum of a golf ball based on golf ball speed after impact, golf ball mass and a stimp reading for a surface over which the golf ball is being struck.

For example, the step of calculating the momentum of the golf ball based on the putter head mass, speed of the putter head at impact, stimp reading for a surface over which the golf ball is being struck and golf ball mass comprises the putting stroke analysis device measuring the putter head velocity at impact as well as after impact. With the knowledge of the putter head mass, the loss of momentum that the putter head suffered due to impacting the golf ball can be calculated. It is assumed that all of this loss of momentum is transferred to the golf ball being struck. Since the golf ball mass is known, golf ball velocity can thusly be calculated. Applying a known stimp reading based on the knowledge of the type of surface over which the golf ball is being struck (or over a simulated playing surface such as a fast green, a medium speed green or a slow green), as a coefficient of friction factor, the estimated distance traveled by the golf ball can then be determined. Alternatively, if the putting stroke analysis device measures golf ball velocity after impact in the same manner as putter head velocity, then a simpler calculation can be used based on stimp to determine the estimated distance that the golf ball would travel after impact.

In a further embodiment, the stored table of values of distances for different putter head speeds for different surfaces is based on historical data inputted by a golfer, or a series of stimpmeter calculations.

The present invention is directed to a putting stroke analyser comprising a planar putting surface having a plurality of infrared emitters and a plurality of co-operating infrared sensors located beneath the planar putting surface; wherein, an infrared beam, emitted from one of the plurality of infrared emitters, may be reflected by a putter head, passing above the planar putting surface, back towards one of the plurality of co-operating infrared sensors to indicate the location of the putter above the planar putting surface.

The present invention is directed to a putting stroke analyser comprising a planar putting surface having a plurality of infrared emitters and a plurality of co-operating infrared sensors located beneath the planar putting surface, whereby the plurality of infrared emitters and a plurality of co-operating infrared sensors are arranged in the substantially same transverse plane beneath the planar putting surface.

DETAILED DESCRIPTION OF EMBODIMENTS

The invention will be more clearly understood from the following description of some embodiments thereof, given by way of example only, with reference to the accompanying drawings, in which.

Figure 1:
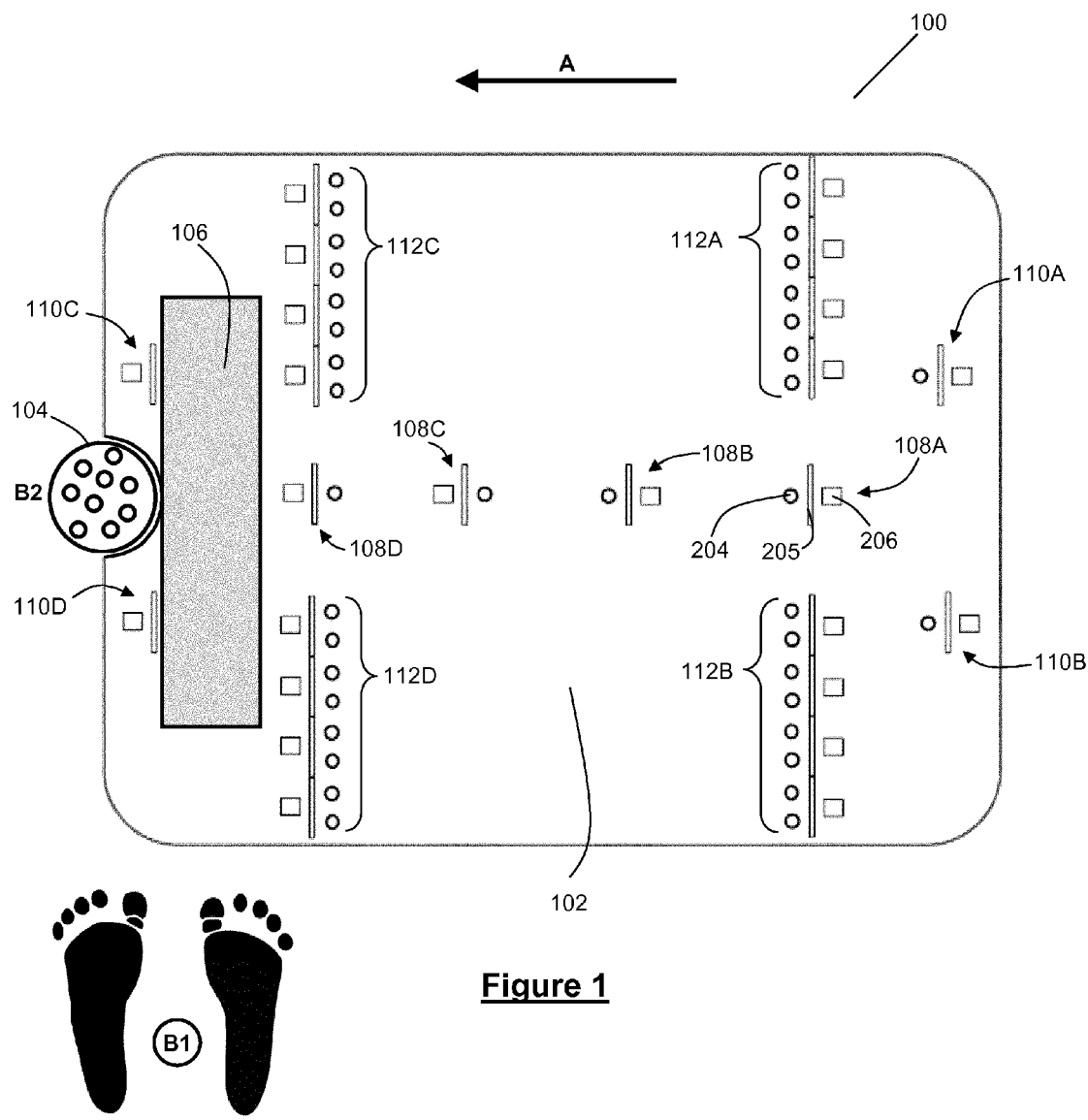
FIG. 1 is a diagrammatic plan view of a putting stroke analysis device having a planar surface with a plurality of infrared emitters and a plurality of co-operating infrared sensors on the planar surface, in accordance with the present invention.

Referring to FIG. 1, there is provided a putting stroke analysis device indicated generally by reference numeral 100. The putting stroke analysis device 100 comprises a planar putting surface 102 which will allow a golf ball 104 to be putted across it, although in the present embodiment, the golf ball 104 is putted, from a position adjacent a side of the planar surface 102, away from the planar surface 102

For a right-handed golfer (not shown), standing in a position indicated by reference B1, the golf ball 104 is typically placed, from the golfer's perspective, to the left side position of the planar surface 102 as indicated by reference B2. The golfer executes a putting stroke technique which causes a putting face on a putting head 106 of a putter to impact the golf ball 104. In doing so, the putter head 106 impacts/strikes the golf ball 104 away from the planar surface 102.

In a preferable embodiment, and as shown in FIG. 1, an appropriately sized semi-circular cut-out may be provided on one side, or on both opposing sides, of the planar surface 102 for assisting a golfer with positioning a golf ball 104 to be struck.

In FIG. 1, the golf ball 104 is struck from position B2, away from the planar surface 102, as the putter head 106 moves in a right-to-left direction, as indicated by reference arrow A. As the golf ball 104 is impacted by the putter head 106, putting characteristics of the putting stroke technique as analysed. The putting stroke technique is analysed based on the putting stroke characteristics which are determined before the putter head 106 impacts with the golf ball 104 and/or as the putter head 106 impacts the golf ball 104. It will be understood that the putting stroke analysis device 100 may be equally used by a left-handed golfer in an analogous manner.

In a further embodiment described hereinbelow, the putting stroke technique is analysed based on the putting stroke characteristics which are determined before the putter head 106 impacts with the golf ball 104, and/or as the putter head 106 impacts the golf ball 104, and/or subsequent to the putter head 106 impacting the golf ball 104. Appropriate means for determining the putting stroke characteristics before the putter head 106 impacts with the golf ball 104, and/or as the putter head 106 impacts the golf ball 104, and/or subsequent to the putter head 106 impacting the golf ball 104 are required.

The putting stroke analysis device 100 comprises a plurality of infrared emitters 204, represented throughout the Figures as circles, and a plurality of co-operating infrared sensors 206, represented throughout the Figures as squares. The plurality of infrared emitters 204 and the plurality of co-operating infrared sensors 206 are located on, or embedded into, the planar putting surface 102. In one embodiment, the plurality of infrared emitters 204 and the plurality of co-operating infrared sensors 206 are in the substantially same transverse plane as one another. The plurality of infrared emitters 204 and the plurality of co-operating infrared sensors 206 are arranged in groups so as to form clusters of infrared emitters 204, and, co-operating infrared sensors 206 adjacent the infrared emitters 204 of the cluster. An infrared blocking shield 205 is positioned intermediate the infrared emitters 204, and, the infrared sensors 206 which are adjacent the infrared emitters 204 in that cluster.

It should be noted that a cluster may contain just one infrared emitter 204 and one infrared sensor 206, with a relatively short infrared blocking shield located therebetween. Alternatively, a cluster could contain a plurality of infrared emitters 204 and a plurality of infrared sensors 206, with a relatively long infrared blocking shield located therebetween or a plurality of relatively short infrared blocking shields located therebetween.

The putting stroke analysis device 100 comprises a number of different clusters 108A-108D inclusive, 110A-110D inclusive and 112A-112D inclusive. Each of the clusters 108A-108D, 110A-110D and 112A-112D are used to measure putter head velocity and acceleration, the angle of the putter head face at impact, and, the putter head path, impact point of the golf ball on the putter head as the putter head impacts the golf ball, the angle of attack of the putter head during a putting stroke, and the like as detailed further hereinbelow.

Figure 2:
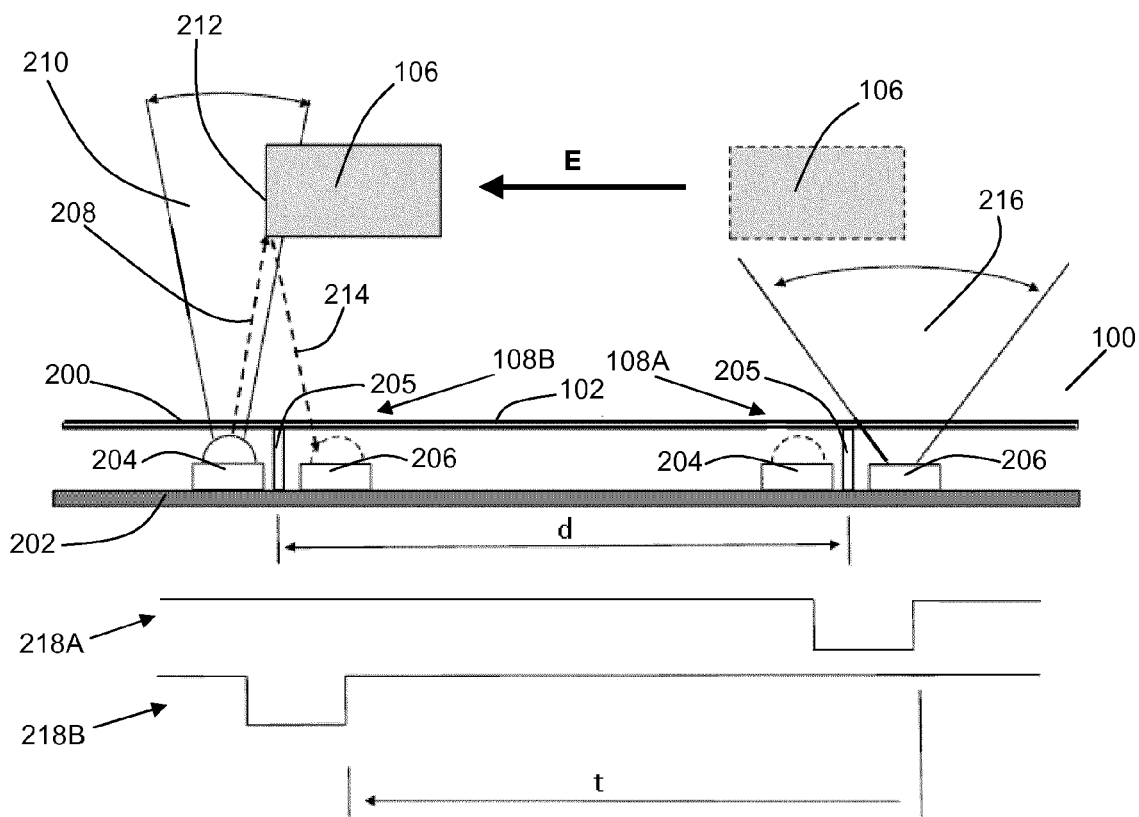
FIG. 2 is a diagrammatic side view of a pair of infrared emitters and a pair of co-operating infrared sensors arranged on the planar surface of the putting stroke analysis device of FIG. 1, along with an exemplary emitted infrared beam and an exemplary reflected infrared beam.

Referring to FIG. 2, the putting stroke analysis device 100 comprises an infrared transmitting surface 200, which acts as the planar putting surface 102. The infrared transmitting surface 200 is substantially in parallel with and spaced apart from a base 202, which may preferably incorporate a printed circuit board (not shown). The infrared emitters 204 and the infrared sensors 206 are located betwixt the infrared transmitting surface 200 and the base 202, with the infrared blocking shield 205 arranged as a substantially vertical wall betwixt the infrared transmitting surface 200 and the base 202, and between the infrared emitters 204 and the infrared sensors 206 adjacent the infrared emitters 204 in that cluster 108A, 108B.

In use, the infrared emitter 204 emits an incident infrared beam 208, which is reflected by a portion of a putter head 106 such as an underside of the putter head 106, passing above the planar putting surface 102 as indicated by reference arrow E, and the incident infrared beam 208 is reflected back towards one of the plurality of co-operating infrared sensors 206 as a reflected infrared beam 214. The incident infrared beam 208 is modulated at substantially 36 kHz so it may be relatively low-powered, and the reflected infrared beam 214 is passed through a 36 kHz bandpass filter in the infrared sensor 206 to remove ambient infrared light which occurs naturally in the environment, or other sources of infrared which are considered as noise. Typically, for an infrared beam modulated at a frequency of 36 kHz, the bandpass filter will have a lower bandpass frequency of approximately 30 kHz and an upper bandpass frequency of approximately 42 kHz. This allows a relatively low powered infrared beam to be emitted from the infrared emitter 204 and to be detected and sensed by one or more of the co-operating infrared sensors 206, without other types of infrared noise signals from interfering with the emitted infrared signal.

The infrared sensor 206 is set up such that the incident infrared beam 208 will only be detected if the putter head 106 is within a near proximity range of 2 mm to 250 mm above the substantially planar putting surface 102. In a further embodiment, by varying infrared power levels relative to measured ambient light the putting stroke analysis device can operate in widely differing lighting conditions ranging from artificial, indoor conditions where relatively low infrared levels are found, to, outdoors conditions in direct sunlight which has relatively high levels of infrared.

The infrared emitter 204 emits an incident infrared beam 208 within a relatively narrow beam angle as indicated by reference numeral 210. When the face 212 of the putter head 106 enters this relatively narrow beam angle 210, in the order of 10-20 degrees, a portion of the putter head 106 reflects the incident infrared beam 208 back towards the infrared sensor 206. The infrared sensor 206 can detect a reflected beam within a sensing area defined by sensing cone 216. Typical half intensity beam angles are +/−10 degrees for lensed infrared emitters 204; or, +/−40 degrees for imbedded lensed infrared emitters 204.

Typical half power angle of directivity for infrared sensors with lenses are approximately +/−45 degrees; and, for infrared sensors 206 with no lenses are approximately +/−75 degrees.

In FIG. 2, the clusters 108A, 108B are located at a distance d from one another. Thus as the infrared sensors 206 detect the putter head 106 passing overhead, as indicated by reference arrow E, each infrared sensors 206 will signal information to a control unit (not shown) that the putter head 106 is moving above it at that point in time. The signal waveforms 218A, 218B show the change in voltage level and represent the information transmitted to the control unit by the infrared sensors 206.

The putter head 106 passes over the infrared sensor 206 which forms part of the rightmost cluster 108A and there is a drop in the voltage of waveform 218A. At a time, t, later, the putter head 106 passes over the infrared sensor 206 which forms part of the leftmost cluster 108B and there is a drop in the voltage of waveform 218B. Thus, the speed of the putter head 106 can be calculated as the time taken to travel the distance d. In other words speed=d×t. In the same way the speed of the putter head 106 can be monitored between clusters 108B and 108C, 108C and 108D.

Thereafter, the acceleration of the putter head 106 across the four co-linearly arranged clusters 108A-108D can be determined.

It will be understood that the velocity may be determined, if desired, by determining the direction of the putter head 106 movement allied to the determined speed of the putter head 106.

The speed and acceleration may be given to the golfer by way of a graphical user interface (not shown) or alternatively could be transmitted wirelessly or over a wired network to an accessory device, such as a mobile phone or computer, to provide the results to the golfer.

It will be understood that the calculation of the putter head velocity and acceleration, the angle of the putter head face at impact, and, the putter head path, angle of attack and impact point may be carried out by bespoke circuitry on the putting stroke analysis device 100 or the putting stroke analysis device 100 may send raw signal information from the infrared sensors 206 to accessory devices for subsequent processing to obtain the putter head velocity and acceleration, the angle of the putter head face at impact, and, the putter head path, angle of attack and impact point.

Figure 3:
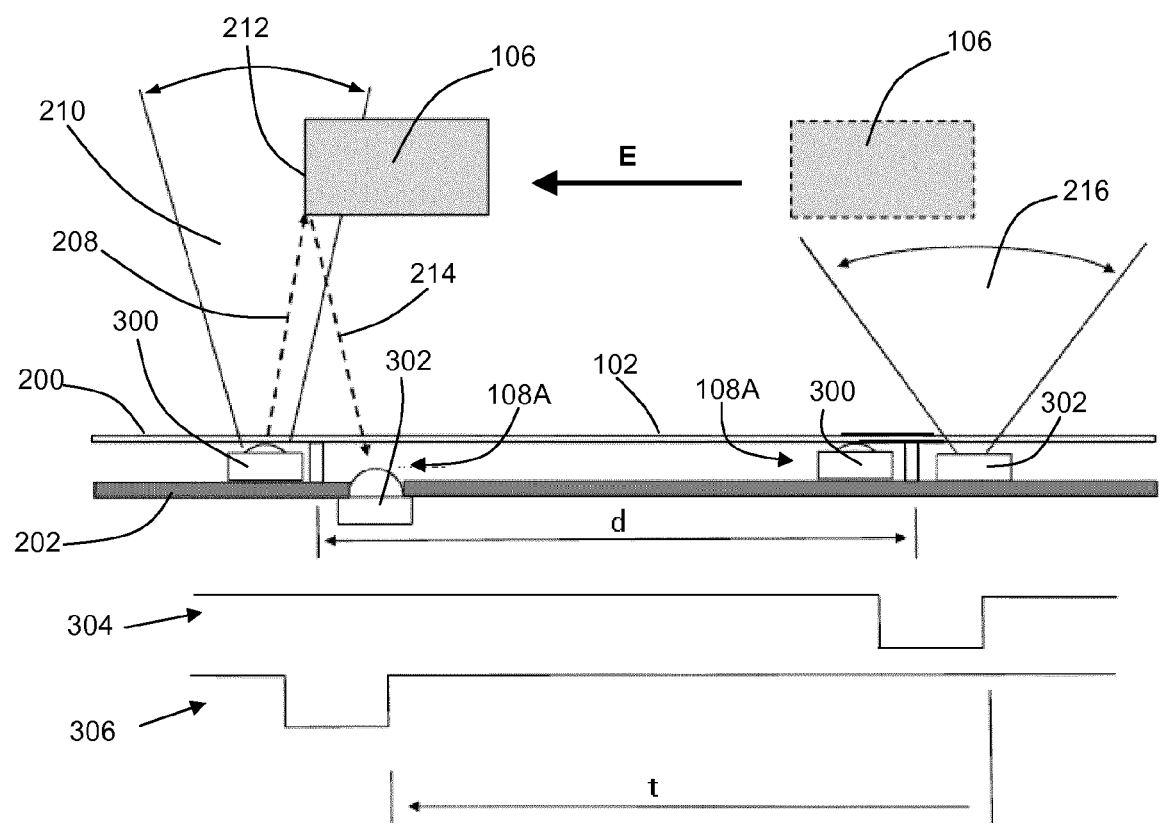
FIG. 3 is a diagrammatic side view of an alternative embodiment of a pair of infrared emitters and sensors respectively located on the putting stroke analysis device of FIG. 1, along with an exemplary emitted infrared beam and an exemplary reflected infrared beam.

With reference to FIG. 3, an alternative embodiment of the present invention is shown, wherein like parts previously described have been assigned the same reference numerals, and whereby infrared emitters 300 and infrared sensors 302 are shown to take different forms so as to decrease the distance betwixt the infrared transmitting surface 200 and the base 202. The infrared sensor 302 may be mounted below the base 202 with an aperture provided. This arrangement will improve the isolation of the infrared sensor 302 from its adjacent infrared emitter 300 and clearly in this embodiment, the infrared transmitter 300 and the co-operating infrared sensor 302 do not lie in the same transverse plane as one another.

The arrangement also narrows the field of sensitivity, the sensing cone, and thus improves accuracy in locating the position of the putter head 106.

It will be readily understood that various configurations of infrared emitter 300 and infrared sensors 302 may be used, with the embodiment of FIG. 3 indicating a type with an embedded lens on the infrared emitter 300. The infrared sensor 302 is indicated in FIG. 3 with a flat top surface having no lens, hence a broader angle of sensitivity, which could be up to +/−80 degrees.

Figure 4:
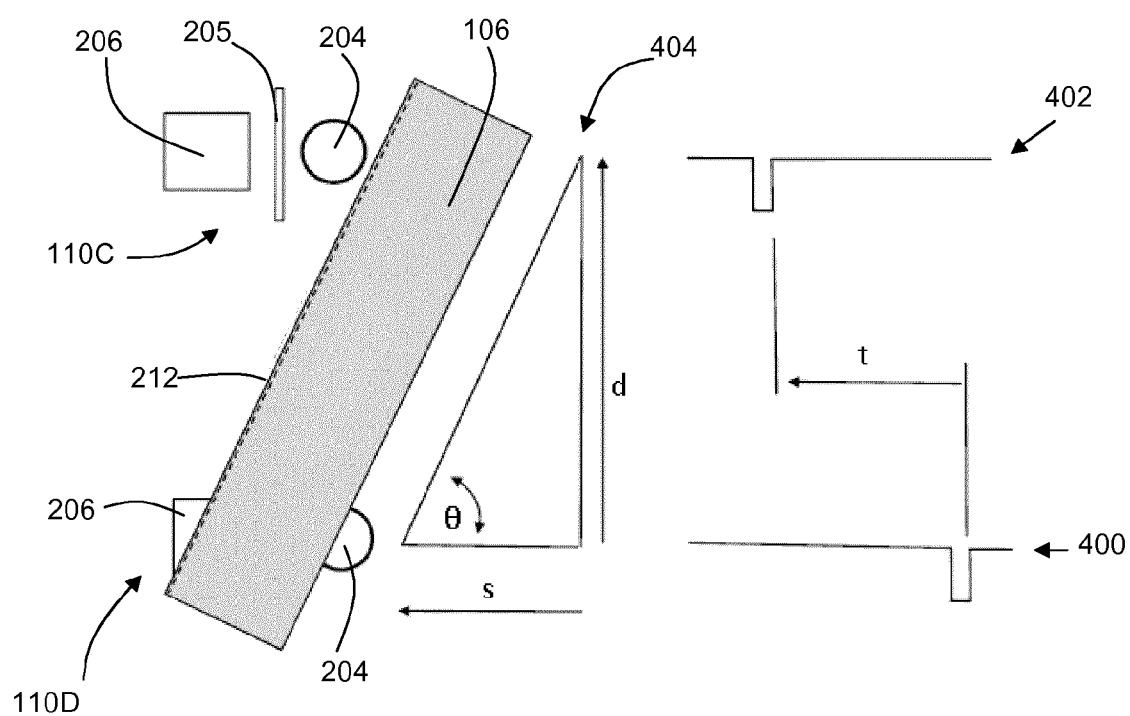
FIG. 4 is a diagrammatic plan view of a putter head of a putter passing over a pair of infrared emitters and a pair of co-operating infrared sensors respectively located on the planar surface of putting stroke analysis device of FIG. 1, so as to measure the angle of the putter head of the putter, along with exemplary detected information waveforms from the pair of infrared sensors.

Referring now to FIG. 4, with reference to the first embodiment shown in FIG. 1, wherein like parts previously described have been assigned the same reference numerals, a pair of substantially co-linearly arranged clusters 110C, 110D, which are adjacent one another are shown. The substantially co-linearly arranged, adjacent clusters 110C, 110D each comprise a single infrared emitter 204, an infrared blocking shield 205 and an co-operating infrared sensor 206. The putter head 106 passes over the clusters 110C, 110D with the putter face 212 of the putter head 106 at an angle to the substantially co-linearly arranged adjacent clusters 110C, 110D. Waveform 402 is representative of an output signal from the co-operating infrared sensor 206 of the upper cluster 110C, and, waveform 400 is representative of the output signal from the sensor 206 of the lower cluster 110D.

As the putter head 106 moves in a right to left direction, the heel of the putter head 106 will pass over the infrared sensor 206 of the lower cluster 110D before the toe of the putter head 106 passes over the infrared sensor 206 of the upper cluster 110C. Thus, the aberration in waveform 400 is seen to occur at an earlier point in time before the aberration in the waveform 402. The aberration in the waveform 400 occurs at a time t before the aberration in the waveform 402. With reference to the calculated triangle 404 of FIG. 4, as the speed of the putter head 106 is known, the distance s can be calculated according to s=t×speed. thus, the angle θ can be calculated according to $\theta=\tan^{-1}(d/s)$, where d is shown in FIG. 4 as being the distance between the substantially co-linearly arranged adjacent clusters 110C, 110D. This calculation is carried out in a processor in the putting stroke analysis device 100. In this manner, the face angle, otherwise referred to as the angle of the putter head when impacting the golf ball (not shown), can be determined.

Figure 5:
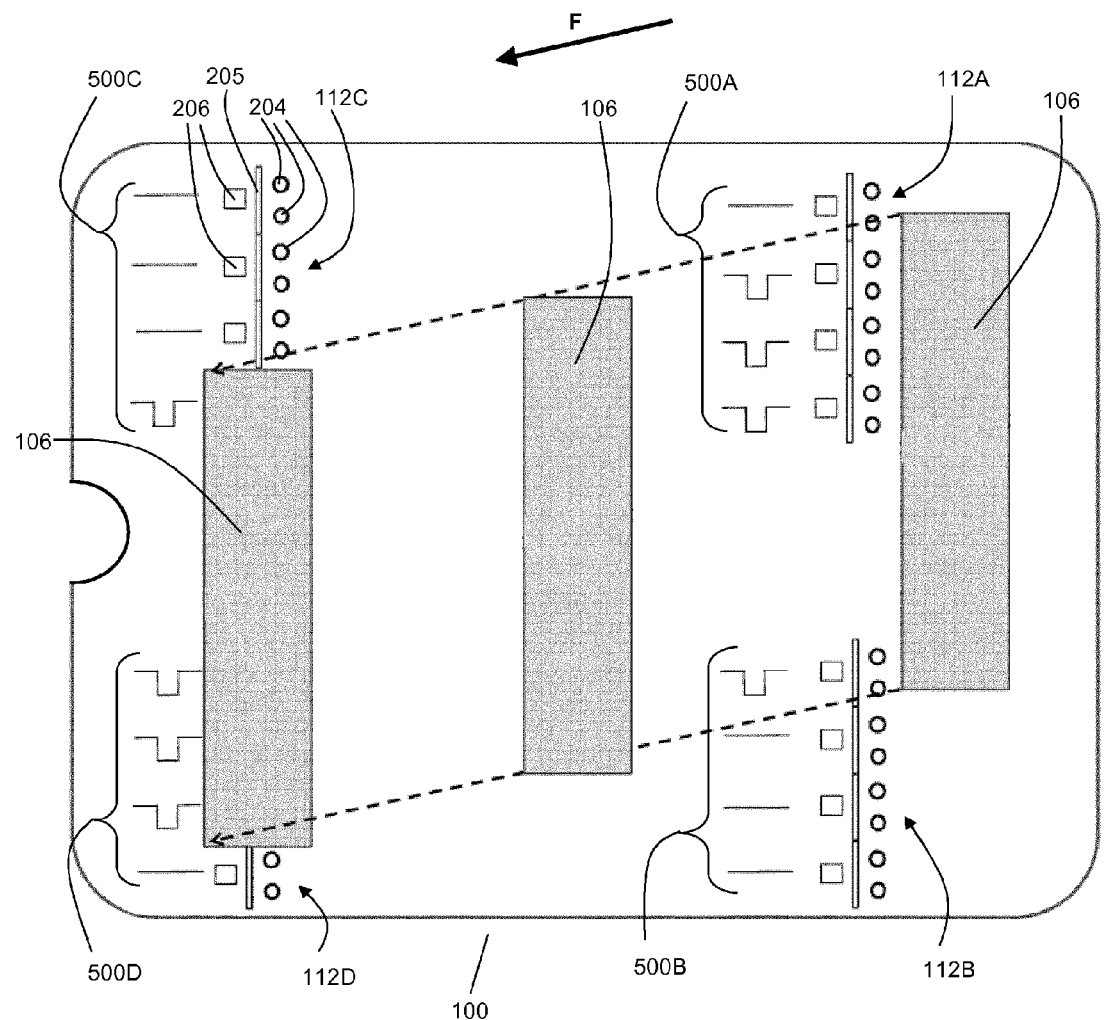
FIG. 5 is a diagrammatic plan view of a putter head of the putter passing over a plurality of clusters of co-linearly arranged infrared emitters and co-operating infrared sensors located on the planar surface of the putting stroke analysis device of FIG. 1, so as to determine the path of the putter, along with exemplary detected information waveforms from the co-operating infrared sensors.

Referring now to FIG. 5, the putter head 106 is shown to travel over the substantially planar putting surface 102 along a swing path as indicated by reference arrow F. A plurality of clusters 112A-112D is used to calculate the putter head swing path.

Each of the plurality of clusters 112A-112D comprise a plurality of co-linearly arranged infrared emitters 204 separated from a plurality of co-linearly arranged co-operating infrared sensors 206, which are separated from one another respectively by an elongated infrared blocking shield 205.

In the embodiment shown in FIG. 5, in each cluster 112A-112D there is provided four co-linearly arranged infrared sensors 206 positioned adjacent eight co-linearly arranged co-operating infrared emitters 204. It will be appreciated that the clusters 112A-112D may be made up of any number of infrared emitters 204 and infrared sensors 206.

A set of waveforms 550A-550D, representative of the output signals from each of the infrared sensors in each of the clusters 112A-112D, is shown in FIG. 5. Each set of waveforms 500A-500D comprises a waveform from each infrared sensor 206 in that cluster. In this way, the position of the toe of the putter head 106 and the heel of the putter head 106 may be calculated by assessing the waveforms in each set of waveforms 500A-550D to determine if the putter head 106 passed over all of the infrared sensors 206 in a particular cluster, or only over some of the infrared sensors 206 in that cluster. The putting stroke analysis device 100 can determine if only some of the lowermost infrared sensors 206 in the cluster detected the putter head 106, if only some of the uppermost infrared sensors 206 in the cluster detected the putter head 106, or, if none of the infrared sensors 206 in the cluster detected the putter head 106. By analysing which of the plurality of infrared sensors 206 detected the putter head 106 passing overhead, points on the path of the putter head 106 can be determined and extrapolated where required such as to determine the swing path of the putter head 106 as it passes over the planar surface. This putting characteristic can be used in conjunction with the putting characteristics for the speed, acceleration, velocity and/or face angle to build up an analysis of a golfer's putting stroke technique.

Figure 6:
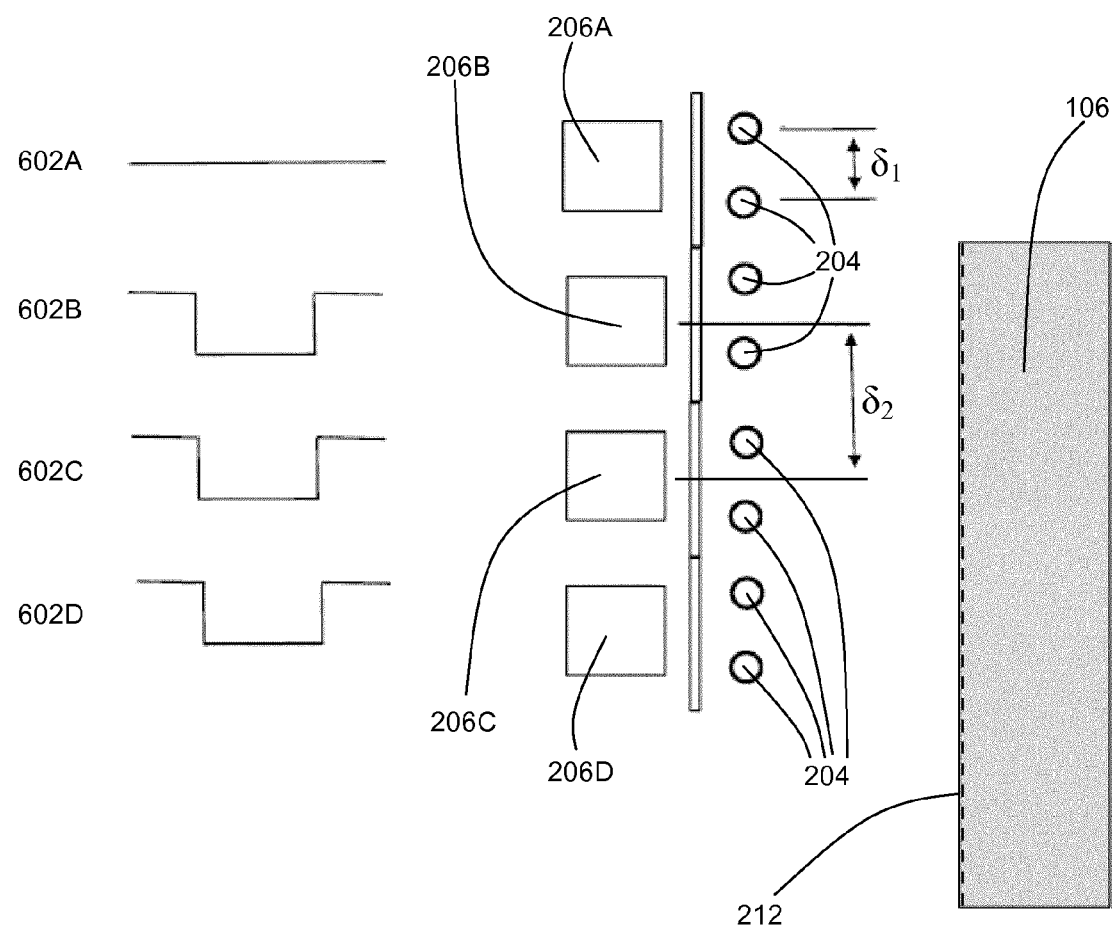
FIG. 6 is a diagrammatic plan view of a putter head passing over a co-linearly arranged plurality of infrared emitters and a co-linearly arranged plurality of co-operating infrared sensors located on the planar surface of the putting stroke analysis device of FIG. 1, along with exemplary output waveforms from the infrared sensors.
Figure 7:
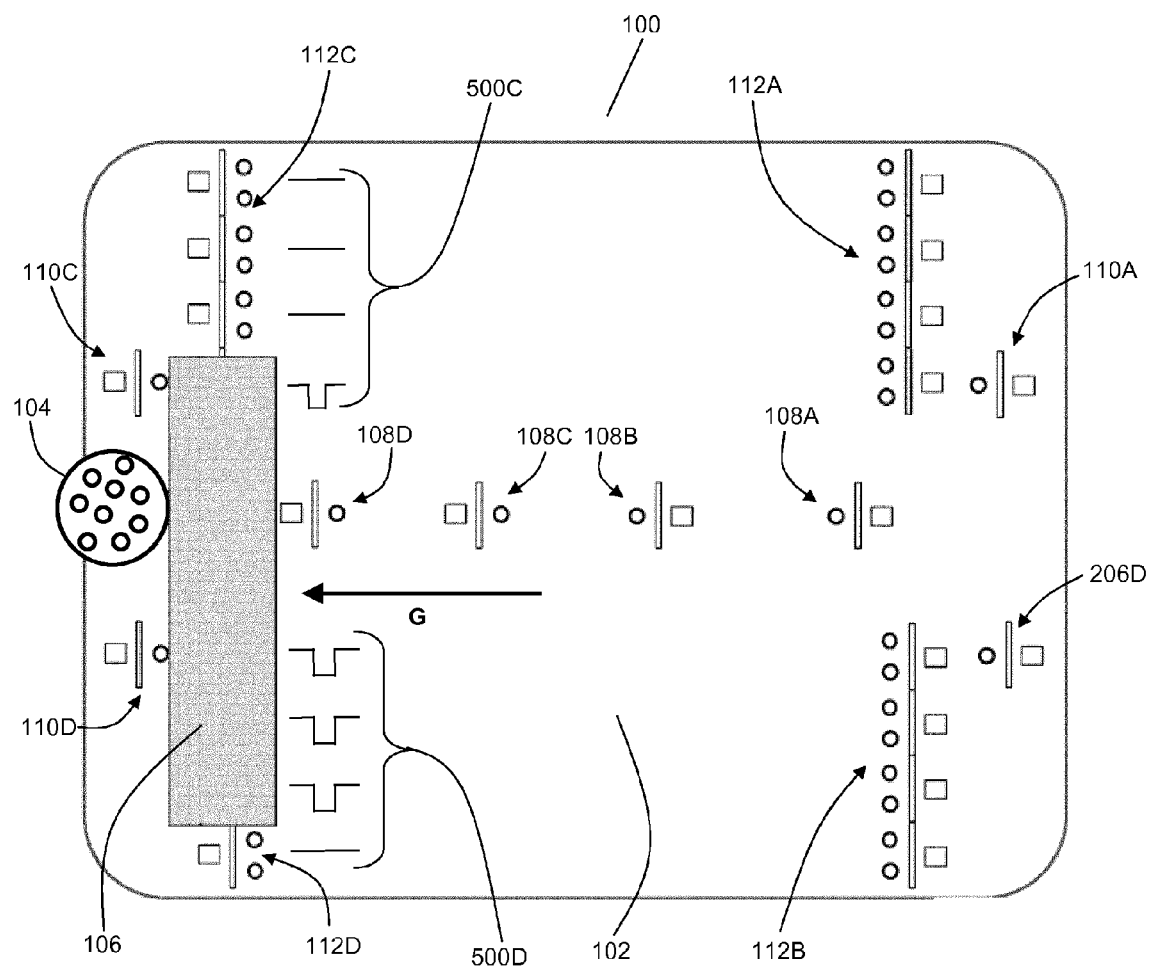
FIG. 7 is a diagrammatic plan view of a putter head passing over a plurality of clusters of co-linearly arranged infrared emitters and co-operating infrared sensors located on the putting stroke analysis device of FIG. 1 so as to determine an impact point of the putter head, along with exemplary output waveforms from the plurality of co-operating infrared sensors.

Furthermore, and with reference to FIGS. 6 and 7, the clusters 112A-112D comprise a plurality of co-linearly arranged infrared emitters 204 separated from a plurality of co-linearly arranged infrared sensors 206. The plurality of co-linearly arranged infrared emitters 204 are separated from the plurality of co-linearly arranged infrared sensors 206 by an elongated infrared blocking shield 205 intermediate the infrared emitters 204 and the infrared sensors 206. The impact point on the putter head, as the putter head 106 impacts a golf ball, can determined by analysing which of the sensors 206A-206D in the plurality of infrared sensors 206A-206D detected the putter head 106 passing overhead. As the position of the golf ball on the planar surface is preset, it is known that if the putter head 106 impacts the golf ball at an impact point which is substantially centrally located on the putter face of the putter head 106, then particular infrared sensors will receive a reflected infrared beam, and other infrared sensors will not receive any infrared beams. The co-linearly arranged infrared sensors 206A-206D are set at a predetermined distance, $\delta_2$, from one another, and the co-linearly arranged infrared transmitters 204 are set at a predetermined distance, $\delta_1$, from one another.

With such a set of co-linearly arranged infrared sensors 206A-206D and infrared emitters 204 are predetermined distances from one another respectively, the position of the putter head 106, relative to the normal position B (FIG. 1) of the golf ball 104 to be struck, can be determined. It can then be understood whether the golf ball 104 was struck at an impact point adjacent a heel of the putter head 106, an impact point substantially centrally on the putter head 106, or at an impact point adjacent a toe of the putter head 106. As can be seen in FIG. 7, wherein the putter head 106 is moving in a right to left direction as indicated by reference arrow G, and where the golfer is standing adjacent the lowermost clusters 112B, 112D, the putter head 106 may be adjudged to be slightly too close to the golfer and consequently the golf ball 104 is struck by the putter head 106 at an impact point adjacent the toe of the putter head 106. This further putting characteristic can be used to construct an overall analysis of the putting stroke technique of a golfer.

In a further embodiment, and with reference to FIG. 6, the plurality of co-linearly arranged infrared emitters 204 are separated from the plurality of co-linearly arranged infrared sensors 206A-206D. Each of the plurality of infrared emitters 204 are switched individually in sequence, with the other infrared emitters 204 switched off, whilst the putter head 106 is detected to be above the plurality of infrared emitters 204. With this sequential activation of the infrared emitters 204, the putting stroke analysis device 100 can detect when the putter head 106 is over a particular infrared emitter 204 in the plurality of infrared emitters 204. For example, when using a 56 kHz modulation frequency is used to carry the infrared beam, at least a 220 us time period is required between switching on an infrared emitter 204 and detecting the reflected infrared beam by a corresponding infrared sensor 206A-206D, due to the infrared sensor's response time. Thus, the sequential activation of the infrared emitters 204 must be carried out with such technical requirements taken into consideration. Furthermore, for example, if the uppermost infrared emitter was the only infrared emitter switched on, and the infrared sensors 206A-206D detected a reflected infrared beam, then the putting stroke analysis device would know that the putter head 106 is passing over the uppermost infrared emitter 204. The second uppermost emitter is switched on as the uppermost emitter 204 is switched off, after a predetermined time period which has been calculated to take account of the response time of the infrared sensors being used and the modulation frequency being used. If any of the infrared sensors 206A-206D then detect a reflected infrared beam then the putting stroke analysis device will know that the putter head is over the second uppermost emitter 204 also. All of the plurality of co-linearly arranged infrared emitters 204 in a cluster are cycled through an on/off sequence in the time taken for a putter head to pass over the cluster. In this manner, the resolution of the accuracy of the determination of the putter head location is within $\delta_1/2$, as the resolution is dependent on the infrared emitters 204 when the infrared emitters 204 are switched on/off in sequence.

In the alternative, where all of the infrared emitters 204 are activated at the same time, the resolution of the accuracy of the determination of the putter head location is only within $\delta_2/2$, where $\delta_2 > \delta_1$. In this alternative embodiment, the resolution is dependent on the distance between the infrared sensors 206 rather than the distance between the infrared emitters 204.

Figure 8:
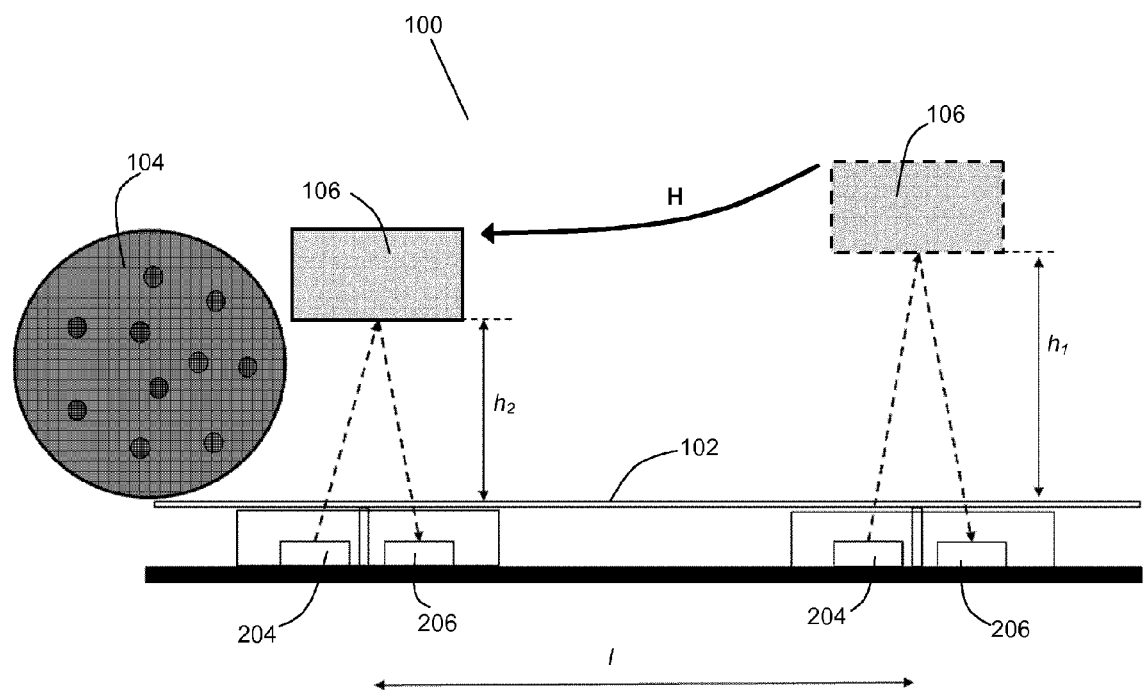
FIG. 8 is a diagrammatic side view of a putter head of a putter passing over a plurality of infrared emitters and a plurality of co-operating infrared sensors located on the planar surface of the putting stroke analysis device of FIG. 1 so as to determine an angle of attack the putter.

With reference to FIG. 8, an angle of attack of the putter head 106 is shown prior to the putter head 106 impacting the golf ball 104. The angle of attack is indicated by reference arrow H. The intensity or power level of a reflected infrared beam detected by an infrared sensor 206 adjacent an infrared emitter 204 is used to estimate a height of the putter head from the planar surface 102. For example, as the putter head 106 follows the angle of attack H, the putter head 106 passes over the rightmost cluster of infrared emitter 204 and infrared sensor 206 at a height $h_1$ and as the putter head 106 follows the angle of attack H, the putter head 106 passes over the leftmost cluster of infrared emitter 204 and co-operating infrared sensor 206 at a height $h_2$ and there is a known distance l between the rightmost cluster and the leftmost cluster. A simple slope, which is indicative of the angle of attack of the putter head can be determined using the determined heights $h_1$ and $h_2$ and the known distance l. If a third cluster is used, then a best-fir curve may be interpolated; and if a plurality of clusters are used, then the accuracy of any interpolated best-fit curve will be increased. The infrared emitters 204 which are used in an angle of attack measurement may preferably use infrared beams modulated at substantially 100 kHz, as such a frequency is outside of the range of typically infrared remote controls used for televisions and other electronic goods and hence the interference with such remote controls is minimised. It will be understood that 100 kHz may also be used for modulation of the infrared beams used in the calculation and determination of any of the other putting characteristics mentioned throughout this specification.

In an alternative embodiment, the infrared beam emitted from the clusters used for determining an angle of attack may be modulated at substantially 180 MHz to 300 MHz and a phase shift calculation may be used to determine the height. As a modulated infrared beam will take a certain amount of time to travel from the infrared emitter 204 to a putter head and be reflected back towards an infrared sensor, the amount of time taken to travel this distance will cause a phase difference, or phase shift, between the modulated incident infrared beam emitted from the infrared emitter and the reflected infrared beam. This phase difference is proportional to the distance traveled by the infrared beam from the infrared emitter to the putter head and back to the infrared sensor. Assuming that the speed of infrared light is $3 \times 10^8$ m/sec, and that the infrared beam is modulated at a frequency of 187.5 Mhz, then a phase shift measurement of 45 degrees will inform that the putter head passed over the infrared emitter and infrared sensor at a height of approximately 200 mm. It will be understood that the determination of the phase shift and determination of distance based on phase shift/phase difference may be carried out using standard well known techniques.

Figure 9:
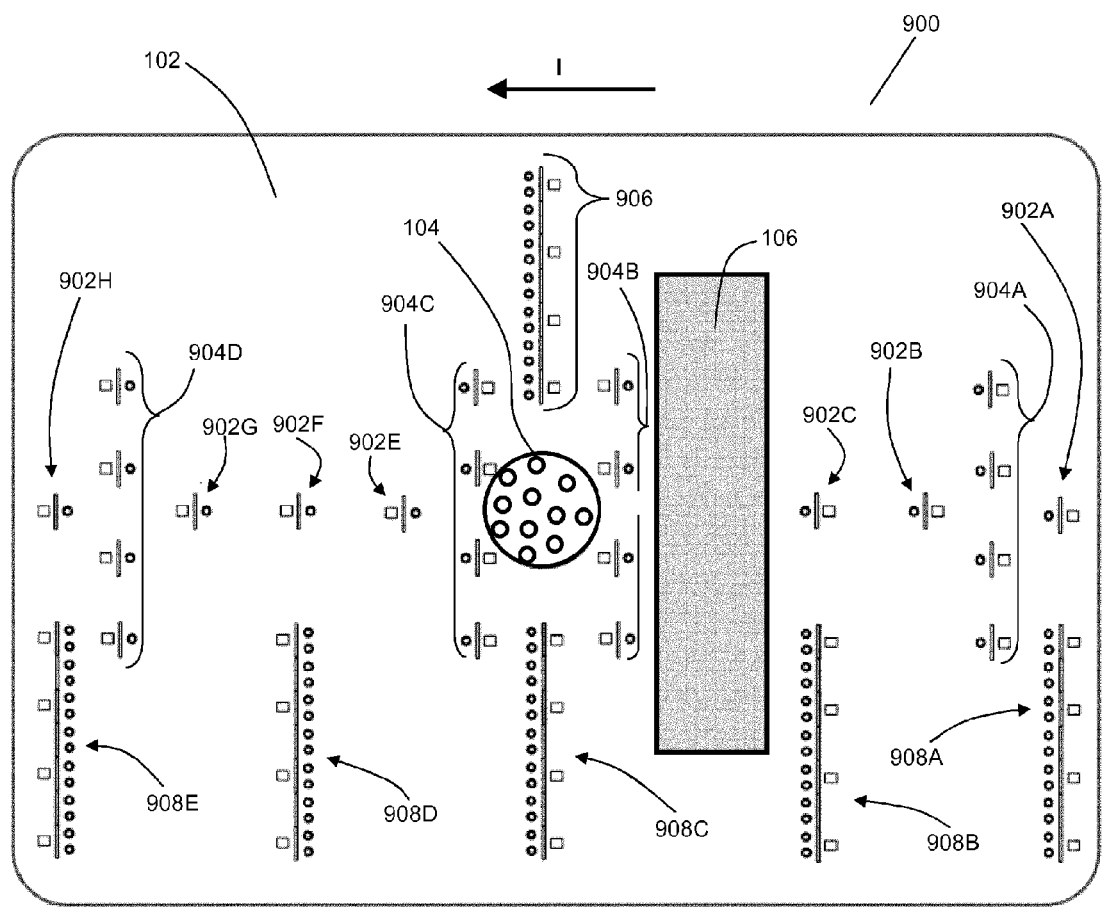
FIG. 9 is a diagrammatic plan view of a putting stroke analysis device in accordance with an alternative embodiment of the present invention; and, FIG. 10 is a diagrammatic plan view of a putting stroke analysis device in accordance with a further embodiment of the present invention.

Referring now to FIG. 9, wherein like parts previously described have been assigned the same reference numerals, an alternative layout of the plurality of infrared emitters 204 and infrared sensors 206 is shown on the putting stroke analysis device generally indicated by reference numeral 900, which acts as the putting stroke analysis device of the present invention. A plurality of speed measuring clusters 902A-902H are arranged in a substantially horizontal manner along a central, longitudinal, axes of the substantially planar putting surface 102. The feedback from the speed measuring clusters 902A-902H can allow the putting stroke analysis device 900 determine the speed and the acceleration of the putter head 106 as it travels over the substantially planar surface 102 of the putting stroke analysis device 900.

Putter head angle measuring clusters 904A-904D are arranged as a plurality of infrared emitters 204 and co-operating infrared sensors 206. The plurality of infrared emitters 204 and infrared sensors 206 of the putter head angle measuring clusters 904A-904D are substantially vertically arranged and the putter head angle measuring clusters 904A-904D are bisected along their midpoints by the central, longitudinal axis of the putting stroke analysis device 900. As previously described, the angle of the face 212 of the putter head 106 can be determined, and indeed a change to the angle of the face 212 of the putter head 106 can also be determined as the putter head 106 travels over the putting stroke analysis device 900. Further putter head path and impact point measuring clusters 906, 908A-908E are located adjacent upper and lower edges of the putting stroke analysis device 900. These putter head path and impact point measuring clusters 906, 908A-908E are used in the manner described here and before to determine the path of the putter head 106, and the impact point of the putter head against the golf ball 104 as the putter head moves in a right to left direction as indicated by reference arrow I.

In the embodiment of FIG. 9, the golf ball 104 can be positioned on left, centre or right points of the putting stroke analysis device 900. The putting stroke can be right-to-left or left-to-right. The configuration of the infrared emitters 204 and infrared sensors 206 provides measurement of both the back-swing and forward swing of the putter head 106 by measuring the speed, acceleration, putter head angle at a number of points including point of impact, putter path, angle of attack, putter head swing path and point of impact on the putter face. In this manner, the various characteristics of the putting stroke technique before, during and after the putter head 106 makes impact with the golf ball 104, may be detected and analysed. It will be understood that any combination of the infrared emitters 204 and the complementary co-operating infrared sensors 206 may be deactivated where analysis is only required before or after the putter head 106 makes impact with the golf ball 104.

Figure 10:
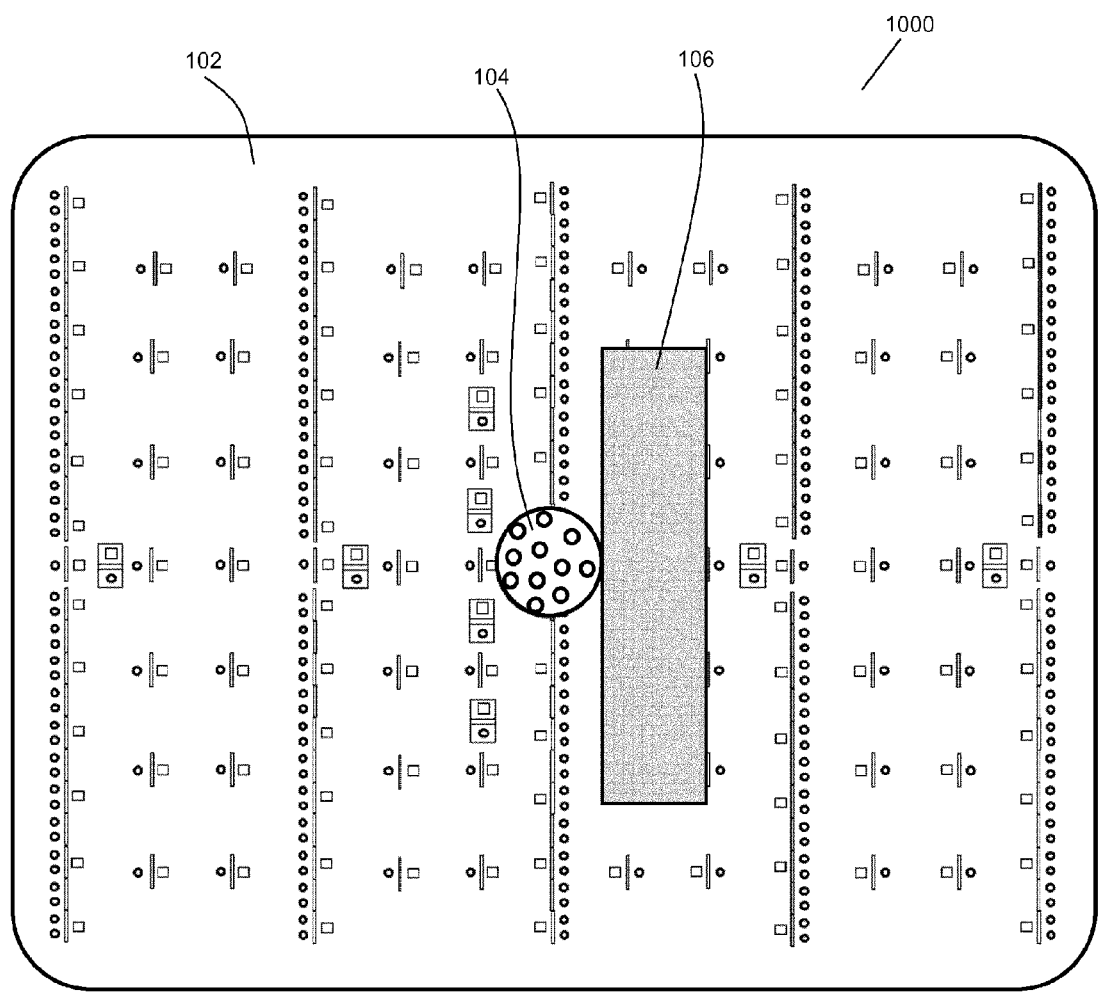

With reference to FIG. 10, a further embodiment of a putting stroke analysis device is shown and is indicated by reference numeral 1000. As before, the putting stroke analysis device 100 comprises a planar surface 102 across which a golf ball 14 may be struck by a putter head 106 passing over the planar surface 102. This embodiment comprises a greater number of infrared emitters and infrared sensors on the planar surface 102 and the putting stroke analysis device 1000 would be envisaged to be used by professional golfers, golf coaches, golf simulators and the like. As the number of infrared emitters and infrared sensors is greater, the accuracy of the measurements taken is greater. However, the basic principles of measuring the putting characteristics of the speed of the putter head, the acceleration of the putter head, the face angle of the putter head as it impacts the golf ball, the path of the putter head during a putting stroke, the angle of attack of the putter head during a putting stroke, and, the impact point on the face of the putter head as it impacts the golf ball are all measured and combine to provide an analysis of the putting stroke technique of the golfer.

The analysis of the putting stroke technique may be give audibly or visually on a screen. The screen may form part of the putting stroke analysis device 100, 900, 1000 or may be separate. Processing means may form part of the putting stroke analysis device 100, 900, 1000 or may be separate, in which case raw data (preferably in the form of output signals from the various infrared sensors) is sent by hard wire or wireless means to a remote processing device whereby the processing is carried out on the remote processing device.

The feedback on the putting stroke technique may be simplified to a "Good Stroke"/"Bad Stoke" feedback or may be more granular to show which aspects of the technique are good/bad or ideal/non-ideal. The determination of whether a characteristic is good/bad, ideal/non-ideal may be made with reference to a default threshold or may be made with respect to a dynamic threshold which can be altered automatically over time or altered manually by the golfer to account of any particular characteristics of the golfer's swing.

It will be readily understood that the present invention may be equally applied to other sports requiring the player to strike a ball from or along the ground using a striking implement such as a club, a stick or a bat. For example field hockey players may practice their free taking stroke. Similarly ice hockey players, hurling players, croquet players, snooker players, pool players, bowlers, archers and the like may also practice, and receive feedback on their stroke.

The putting stroke analysis device 100, 900, 1000 may preferably have the depth of approximately 3 mm to 6 mm.

It will be understood that the speed, acceleration and/or velocity of the golf ball may be determined instead of the putter head.

Interpolation or best-fit curves may be used where appropriate when determining swing path and/or angle of attack and/or face angle.

It will be generally understood that the infrared sensors 206 will require a high gain as the reflectivity of putter head can vary. Preferably the gain of the infrared sensors 206 will be in the region of 40 dB.

It will be appreciated that any number of infrared emitters and infrared sensor may be used in the clusters of infrared emitters and infrared sensors, and that any number of clusters may be used to determine the various characteristics of the putting stroke. It is understood that the greater the number of infrared emitters, infrared sensors and/or clusters, the greater the resolution and accuracy of the putting stroke analysis device of the present invention.

The term golfer is applicable to any user of the putting stroke analysis device 100, 900, 1000 and may refer to a golfer's coach and other such people interested in the outcome of the analysis of the golfer's putting stroke technique.

The terms "comprise" and "include", and any variations thereof required for grammatical reasons, are to be considered as interchangeable and accorded the widest possible interpretation.

It will be understood that the components shown in any of the drawings are not necessarily drawn to scale, and, like parts shown in several drawings are designated the same reference numerals.

The invention is not limited to the embodiments hereinbefore described which may be varied in both construction and detail.

The invention claimed is:

1. A putting stroke analysis device for analysing a putting stroke technique of a golfer using a putter, the putting stroke analysis device comprising:
    a planar surface having a plurality of infrared emitters and cooperating infrared sensors arranged on the planar surface, each of the plurality of infrared emitters being capable of emitting an infrared beam, and, each of the plurality of cooperating infrared sensors being capable of detecting a reflected infrared beam;
    the reflected infrared beam being generated by a putter, passing above the plurality of infrared emitters and cooperating infrared sensors on the planar surface, during the execution of the putting stroke technique by the golfer; and
    a processor configured to receive information from at least one of the plurality of cooperating infrared sensors and to process the received information to determine putting characteristics of the putting stroke technique; wherein, the infrared beam emitted by the infrared emitter is modulated using a modulation frequency to carry the infrared beam;
    a band pass filter centered substantially at the modulation frequency to attenuate detected infrared beams outside of a band pass filter range; and
    a high gain amplifier.

2. The putting stroke analysis device as claimed in claim 1, wherein, the plurality of infrared emitters and the plurality of co-operating infrared sensors are arranged in a plurality of clusters;
    each of the plurality of clusters comprising at least one infrared emitter, at least one co-operating infrared sensor, and, an infrared blocking shield located intermediate the at least one infrared emitter and the at least one co-operating infrared sensor such that only the reflected infrared beam can be detected by the at least one co-operating infrared sensor.

3. The putting stroke analysis device as claimed in claim 2, wherein, at least one cluster comprises a plurality of infrared emitters arranged in a co-linear manner and a plurality of co-operating infrared sensors arranged in a co-linear manner;

wherein, the plurality of co-linear infrared emitters and the plurality of co-linear co-operating infrared sensors are arranged in parallel; and the at least one cluster further comprising an elongated infrared blocking shield located intermediate the plurality of co-linear infrared emitters and the plurality of co-linear co-operating infrared sensors, such that only the reflected infrared beam can be detected by the at least one co-operating infrared sensor.

4. The putting stroke analysis device as claimed in claim 2, wherein, at least one cluster comprises a plurality of infrared emitters arranged in a co-linear manner and a plurality of co-operating infrared sensors arranged in a co-linear manner;

wherein the plurality of co-linear infrared emitters and the plurality of co-linear co-operating infrared sensors are arranged in parallel; and the at least one cluster further comprising a plurality of infrared blocking shields which are located intermediate the plurality of co-linear infrared emitters and the plurality of co-linear co-operating infrared sensors respectively, such that only the reflected infrared beam can be detected by the at least one co-operating infrared sensor.

5. The putting stroke analysis device as claimed in claim 1, wherein, the infrared beam emitted by the infrared emitter is modulated at a modulation frequency in a range of 20 kHz to 100 kHz.

6. The putting stroke analysis device as claimed in claim 1, wherein, the infrared beam emitted by the infrared emitter is modulated at a modulation frequency of substantially 38 kHz.

7. The putting stroke analysis device as claimed in claim 1, wherein, the infrared beam emitted by the infrared emitter is modulated at a modulation frequency of substantially 56 kHz.

8. The putting stroke analysis device as claimed in claim 1, wherein, the band pass filter is centered at substantially 38 kHz.

9. The putting stroke analysis device as claimed in claim 1, wherein, the band pass filter is centered at substantially 56 kHz.

10. The putting stroke analysis device as claimed in claim 1, wherein, the high gain amplifier comprises at least a 40 dB gain.

11. The putting stroke analysis device as claimed in claim 1, wherein, one of the putting characteristics of the putting stroke technique is an angle of a putter head of the putter, wherein the angle of the putter head is measured with respect to an ideal putting line.

12. The putting stroke analysis device as claimed in claim 1, wherein, one of the putting characteristics of the putting stroke technique is an impact point of a putter head of the putter, wherein the impact point is measured as being a point on a putter face of the putter head which impacted with a golf ball.

13. The putting stroke analysis device as claimed in claim 1, wherein, one of the putting characteristics of the putting stroke technique is a swing path of a putter head of the putter, wherein the swing path is measured as being a path along which the putter head travelled prior to impacting with a golf ball.

14. The putting stroke analysis device as claimed in claim 1, wherein, the putting stroke analysis device comprises a putt distance look-up table holding putt distance values based on putter speed and/or putter acceleration values;

wherein the putting stroke analysis device determines a distance of a putt by:
measuring a speed and/or an acceleration of a putter head of the putter substantially as the putter impacts a golf ball; and,
consulting the putt distance look-up table to retrieve a putt distance value based on the measured speed and/or an acceleration of the putter head of the putter.

15. The putting stroke analysis device as claimed in claim 14, wherein, the putt distance look-up table holds putt distance values based on putter speed and/or putter acceleration values, and, based on type of surface which the putting stroke analysis device is being used on;

wherein the putting stroke analysis device determines a distance of a putt by:
ascertaining which type of surface the putting stroke analysis device is being used on;
measuring a speed and/or an acceleration of a putter head of the putter substantially as the putter impacts a golf ball; and,
consulting the putt distance look-up table to retrieve a putt distance value based on the ascertained type of surface the putting stroke analysis device is being used on, and, the measured speed and/or an acceleration of the putter head of the putter.

16. The putting stroke analysis device as claimed in claim 14, wherein, the putt distance look-up table holds putt distance values based on historical data input by the golfer, or a series of stimp meter calculations input by the golfer.

17. The putting stroke analysis device as claimed in claim 14, wherein, the step of measuring a speed and/or an acceleration of a putter head of the putter substantially as the putter impacts a golf ball comprises measuring a speed and/or an acceleration of a putter head of the putter within a predetermined time period of a putter head of the putter impacting the golf ball.

18. The putting stroke analysis device as claimed in claim 1, wherein, the putting stroke analysis device determines a distance of a putt by a calculation of a momentum of a golf ball struck by the putter, based on a mass of a putter head of the putter, a speed of the putter head of the putter as the putter impacts the golf ball, a stimp reading and a mass of the golf ball.

* * * * *